United States Patent [19]
Longo et al.

[11] Patent Number: 5,912,956
[45] Date of Patent: Jun. 15, 1999

[54] SYSTEM AND METHOD FOR ANONYMOUSLY ESTABLISHING TELEPHONIC CONNECTIONS

[75] Inventors: Robert Jon Longo, Colfax; Ronald V. Frazier, Alta, both of Calif.

[73] Assignee: Talk Time, Inc., Auburn, Calif.

[21] Appl. No.: 08/803,288

[22] Filed: Feb. 20, 1997

[51] Int. Cl.$^6$ ............................................. H04M 17/00
[52] U.S. Cl. ....................... 379/144; 283/74; 40/300; 40/299; 40/586
[58] Field of Search ........................... 379/144, 150, 379/149, 153, 155, 93.02, 93.03, 93.23, 142, 210, 211, 38; 235/377–378; 283/70, 74, 67, 301; 40/300, 586, 584, 301; 340/573, 691

[56] References Cited

U.S. PATENT DOCUMENTS

| | | | |
|---|---|---|---|
| 4,325,570 | 4/1982 | Estrada | 283/7 |
| 4,650,219 | 3/1987 | Sigman | 283/70 |
| 4,893,840 | 1/1990 | Berkowitz | 283/81 |
| 5,036,610 | 8/1991 | Fehr | 40/300 |
| 5,272,748 | 12/1993 | Davis | 379/63 |
| 5,291,399 | 3/1994 | Chaco | 364/413 |
| 5,353,335 | 10/1994 | D'Urso et al. | 379/155 |
| 5,380,046 | 1/1995 | Stephens | 283/75 |
| 5,454,350 | 10/1995 | Bethell | 119/858 |
| 5,515,033 | 5/1996 | Matarazzo | 340/573 |
| 5,570,081 | 10/1996 | Holstrom | 340/573 |
| 5,597,072 | 1/1997 | Lieberman et al. | 206/534 |
| 5,658,016 | 8/1997 | Goeken | 283/107 |
| 5,752,335 | 5/1998 | Shimogori et al. | 40/300 |
| 5,765,875 | 6/1998 | Rowley | 283/74 |

OTHER PUBLICATIONS

The Sciences magazine; *Technology Update—"Why pay for cellular phone service if you only want it for emergency use?"*; Comtrad Industries advertisement; Nov./Dec. 1996.

Primary Examiner—Curtis A. Kuntz
Assistant Examiner—Rexford Barnie
Attorney, Agent, or Firm—Oppenheimer Wolff & Donnelly LLP

[57] ABSTRACT

A system and method for anonymously establishing telephonic connections includes a plurality of identification tags, a master control telephone calling card, a computer-executable program, a voice synthesizer and a telephone switch. The identification tags are carried by persons, pets or objects and each include unique visible indicia which provide instructions on how a holder or finder of an identification tag can make a toll-free telephone call to a person responsible for the person, pet or object carrying the identification tag. The visible indicia also include a simplified menu of system inputs. The system employs the computer-executable program and the voice synthesizer to interactively prompt a caller to select and enter inputs from the menu shown on the tag. The system then employs the selected inputs and stored data accessible to the computer executable program to anonymously establish telephonic connections at the telephone switch between the caller and a person responsible for the person, pet or object associated with the tag. The master control card is provided to a system subscriber and has visible indicia including a master control personal identification number (PIN). When the master control PIN is provided to the system, a different portion of the computer-executable program is executed thereby enabling the system subscriber to remotely change the stored data exploit other system features which are inaccessible to holders of the identification tags.

22 Claims, 7 Drawing Sheets

200

```
┌─────────────────────────────────────────────────────────────────┐
│ THE TELE-I.D. OWNER CALLS THE 800 PHONE NUMBER, AND ENTERS PIN  │
│ NUMBER. WHEN THE OPENING MESSAGE BEGINS THE TELE-I.D. OWNER     │
│ PUSHES NUMBER 1 THEN NUMBER 0.                                  │
└─────────────────────────────────────────────────────────────────┘
                                 ↓
┌─────────────────────────────────────────────────────────────────┐
│ "WELCOME TO THE TELE-I.D. AUTO DIALER SYSTEM PROMPT SET-UP.     │
│ PLEASE ENTER YOUR 3 DIGIT CODE".                                │
└─────────────────────────────────────────────────────────────────┘
                                 ↓
┌─────────────────────────────────────────────────────────────────┐
│ THE TELE-I.D. OWNER ENTERS THEIR SPECIAL 3 DIGIT CODE.          │
└─────────────────────────────────────────────────────────────────┘
                                 ↓
┌─────────────────────────────────────────────────────────────────┐
│ "PLEASE ENTER THE PROMPT THAT YOU WANT TO PROGRAM"              │
└─────────────────────────────────────────────────────────────────┘
                                 ↓
┌─────────────────────────────────────────────────────────────────┐
│ THE TELE-I.D. OWNER SELECTS FROM PROMPTS 3 - 8. THE CALLER      │
│ SELECTS PROMPT# 3 BY PRESSING# 3                                │
└─────────────────────────────────────────────────────────────────┘
                                 ↓
┌─────────────────────────────────────────────────────────────────┐
│ "PLEASE ENTER THE PHONE NUMBER THAT YOU WOULD LIKE PROMPT# 3    │
│ TO CALL. PLEASE INCLUDE YOUR AREA CODE.                         │
└─────────────────────────────────────────────────────────────────┘
                                 ↓
┌─────────────────────────────────────────────────────────────────┐
│ THE TELE-I.D. OWNER ENTERS THE PHONE NUMBER. XXX XXX XXXX       │
└─────────────────────────────────────────────────────────────────┘
                                 ↓
┌─────────────────────────────────────────────────────────────────┐
│ "YOU ENTERED XXX XXX XXXX, IF THIS IS THE PHONE NUMBER THAT YOU │
│ WANT PROMPT# 3 TO CALL PRESS THE * BUTTON OR ENTER THE NEW      │
│ NUMBER NOW".                                                    │
└─────────────────────────────────────────────────────────────────┘
                                 ↓
┌─────────────────────────────────────────────────────────────────┐
│ THE TELE-I.D. OWNER ENTERS THE * BUTTON.                        │
└─────────────────────────────────────────────────────────────────┘
                                 ↓
┌─────────────────────────────────────────────────────────────────┐
│ "IF YOU WOULD LIKE TO PROGRAM ANOTHER PROMPT, PRESS THE NUMBER  │
│ OF THE PROMPT OR PRESS THE * BUTTON AGAIN TO RETURN TO THE      │
│ MAIN MENU"                                                      │
└─────────────────────────────────────────────────────────────────┘
                                 ↓
┌─────────────────────────────────────────────────────────────────┐
│ THE TELE-I.D. OWNER ENTERS THE * BUTTON AND RETURNS TO MAIN     │
│ MENU.                                                           │
└─────────────────────────────────────────────────────────────────┘
```

┌─────────────────────────────────────────────────────────────────────────┐
│   THE TELE-I.D. OWNER CALLS THE 800 PHONE NUMBER, AND ENTERS PIN        │
│ NUMBER. WHEN THE OPENING MESSAGE BEGINS THE TELE-I.D. OWNER PUSHES      │
│                      NUMBER 1 THEN NUMBER 1.                            │
└─────────────────────────────────────────────────────────────────────────┘
                                     ↓
┌─────────────────────────────────────────────────────────────────────────┐
│       "WELCOME TO THE TELE-I.D. VOICE INFO/MEDICAL PROMPT SET-UP.       │
│              PLEASE ENTER YOUR 3 DIGIT CODE".                           │
└─────────────────────────────────────────────────────────────────────────┘
                                     ↓
         ┌───────────────────────────────────────────────────────┐
         │   THE TELE-I.D. OWNER ENTERS THEIR SPECIAL 3 DIGIT CODE. │
         └───────────────────────────────────────────────────────┘
                                     ↓
┌─────────────────────────────────────────────────────────────────────────┐
│  "PLEASE PRESS# 9 AND AT THE TONE RECORD UP TO A 60 SECOND MESSAGE.     │
│    WHEN YOU FINISH YOUR MESSAGE PRESS 9 AGAIN TO END RECORDING.         │
└─────────────────────────────────────────────────────────────────────────┘
                                     ↓
┌─────────────────────────────────────────────────────────────────────────┐
│     THE TELE-I.D. OWNER CALLS GIVES MESSAGE THOUGH TELEPHONE AND         │
│                PRESS# 9 AGAIN TO END RECORDING.                          │
└─────────────────────────────────────────────────────────────────────────┘
                                     ↓
        ┌────────────────────────────────────────────────────────┐
        │   "THE FOLLOWING IS THE MESSAGE THAT A CALLER WILL HEAR". │
        └────────────────────────────────────────────────────────┘
                                     ↓
            ┌──────────────────────────────────────────────┐
            │   THE TELE-I.D. OWNER HEARS THE RECORDER MESSAGE. │
            └──────────────────────────────────────────────┘
                                     ↓
┌─────────────────────────────────────────────────────────────────────────┐
│  "IF THIS IS THE MESSAGE THAT YOU WANT A CALLER TO HEAR, PRESS THE *    │
│       BUTTON OR PRESS# 9 AGAIN TO RECORD A NEW MESSAGE".                │
└─────────────────────────────────────────────────────────────────────────┘
                                     ↓
┌─────────────────────────────────────────────────────────────────────────┐
│     THE TELE-I.D. OWNER ENTERS THE * BUTTON AND IS RETURNED             │
│                    TO THE OPENING MESSAGE.                              │
└─────────────────────────────────────────────────────────────────────────┘
```

*FIG. 9*

SYSTEM AND METHOD FOR ANONYMOUSLY ESTABLISHING TELEPHONIC CONNECTIONS

BACKGROUND OF THE INVENTION

1. Field of the Invention

The present invention relates to a system and method for anonymously establishing telephonic connections and, more particularly, pertains to a computer-controlled telephone switch system which employs a plurality of individual tags as an initial prompting mechanism. The individual tags are carried by persons (e.g., children, youths, seniors), pets or valuable objects and each include unique visible indicia which provide a simplified set of instructions on how a finder of an individual tag can make a toll-free telephone call to a person responsible for the person, pet or object carrying the located tag. The visible indicia also include a simplified menu of system inputs. The system interactively prompts a caller to select and enter inputs from the menu shown on the tag. The system then employs the selected inputs and other stored data to anonymously establish telephonic connections between the caller and a person or persons responsible for the person, pet or object carrying the tag.

2. Description of the Related Art

The prior art discloses a number of systems where identification tags are employed to contact a telephone operator who, in turn, contacts someone responsible for a particular person or animal bearing an identification tag. For example, U.S. Pat. No. 4,650,219 to Sigman discloses a child identification system which includes a tag on a child's clothing. The tag includes an alphanumeric marking which allows the finder of the child to contact a telephone operator who, in turn, notifies the parents of the lost child, thereby preventing strangers from learning the name of the child or parents. Similarly, U.S. Pat. No. 5,036,610 to Fehr discloses a system for identifying a lost pet. The disclosed system includes a tag with a telephone number and a unique code number worn by a pet. A finder of the pet contacts an operator by calling the telephone number of the tag of a located pet. The operator then identifies the owner of the pet associated with the unique code and telephones the owner.

However, the art is still without a system which employs a plurality of unique individual tags to initially prompt finders of the tags to remotely contact a computer-controlled telephone switch by making a toll-free telephone call. Furthermore, the art is without a computer-controlled telephone switch system which provides vocal instructions to the callers includes a plurality of individual tags with a simplified menu of system inputs, includes a master control card for changing stored data accessible to the system and making telephone calls to any desired number, and anonymously establishes telephonic connections depending upon the inputs selected by a caller and the stored data provided by the holder of the master control card. Accordingly, it is an object of the present invention to provide such a system and method for anonymously establishing telephonic connections.

SUMMARY OF THE INVENTION

In accordance with a specific illustrative embodiment of the present invention, a system for anonymously establishing telephonic connections includes a plurality of identification tags and a processor. The plurality of identification tags include visible indicia providing information needed for finders of the identification tags to place toll-free telephone calls to a computer-controlled telephone switching system and to provide selected inputs from the visible indicia to the computer controlled telephone switching system. The processor is adapted to receive the selected inputs and to control the computer controlled telephone switching system to anonymously establish telephonic connections between finders of the identification tags and persons responsible for people, pets or objects associated with the identification tags.

In another aspect of the present invention, the system includes a plurality of identification tags, a master control telephone calling card, a computer-executable program, a voice identification tags include visible indicia providing information needed for finders of the identification tags to place toll-free telephone calls at a remote telephone and to enter selected inputs from the visible indicia at the remote telephone. The master control telephone calling card includes visible indicia providing information needed for a master controller to provide programming inputs to the telephone switching system. The computer-executable program is for execution on a processor adapted to receive the selected inputs and to generate switching control inputs and voice synthesizer control inputs depending upon the selected inputs. The processor is adapted to receive the programming inputs and to change stored data provided to the computer-executable program depending upon the programming inputs. The voice synthesizer is adapted to receive the voice synthesizer control inputs and to generate vocal instructions to interactively prompt a finder of one of the identification tags to enter the selected inputs at the remote telephone. The telephone switching system is electrically connected to the voice synthesizer and adapted to receive the switching control inputs. The telephone switching system establishes telephonic connections between the finders of the identification tags and persons responsible for people, pets or objects associated with the identification tags.

In another aspect of the present invention, the system includes a memory device embodying a computer-executable program adapted to receive and process selected inputs from finders of a plurality of identification tags to generate switching control inputs for a telephone switching system depending upon the selected inputs.

In another aspect of the present invention, a method for anonymously establishing telephonic connections includes the steps of:

(a) providing a plurality of identification tags including visible indicia of:
  (1) a central telephone number associated with a central telephone switch;
  (2) a unique personal identification number (PIN) for each of said identification tags; and
  (3) a series of speed dial prompt numbers;
(b) telephoning said central telephone number on a located identification tag of said identification tags from a remote telephone to establish a telephonic connection between said central telephone switch and said remote telephone;
(c) from said central telephone switch, providing a vocal instruction delivered at said remote telephone to enter said PIN number on said located identification tag;
(d) from said remote telephone, entering said PIN number on said located identification tag;
(e) from said central telephone switch, providing a vocal instruction delivered at said remote telephone to enter a selected speed dial prompt number from said series of speed dial prompt numbers;
(f) from said remote telephone, entering said selected speed dial prompt number;

(g) via said central telephone switch, employing said PIN on said located identification tag and said selected speed dial prompt number to establish a telephonic connection between a telephone of a person responsible for an object associated with said located identification tag and said remote telephone; and (h) repeating steps (a)–(g) for different identification tags bearing different PIN numbers.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 8 is a flow chart illustrating an exemplary message sequence for the auto dialer setup feature of the system of FIG. 1; and FIG. 9 is a flow chart illustrating an exemplary message sequence for the record announce only message feature of the system of FIG. 1.

DETAILED DESCRIPTION OF THE PREFERRED EMBODIMENTS

Figure 1:
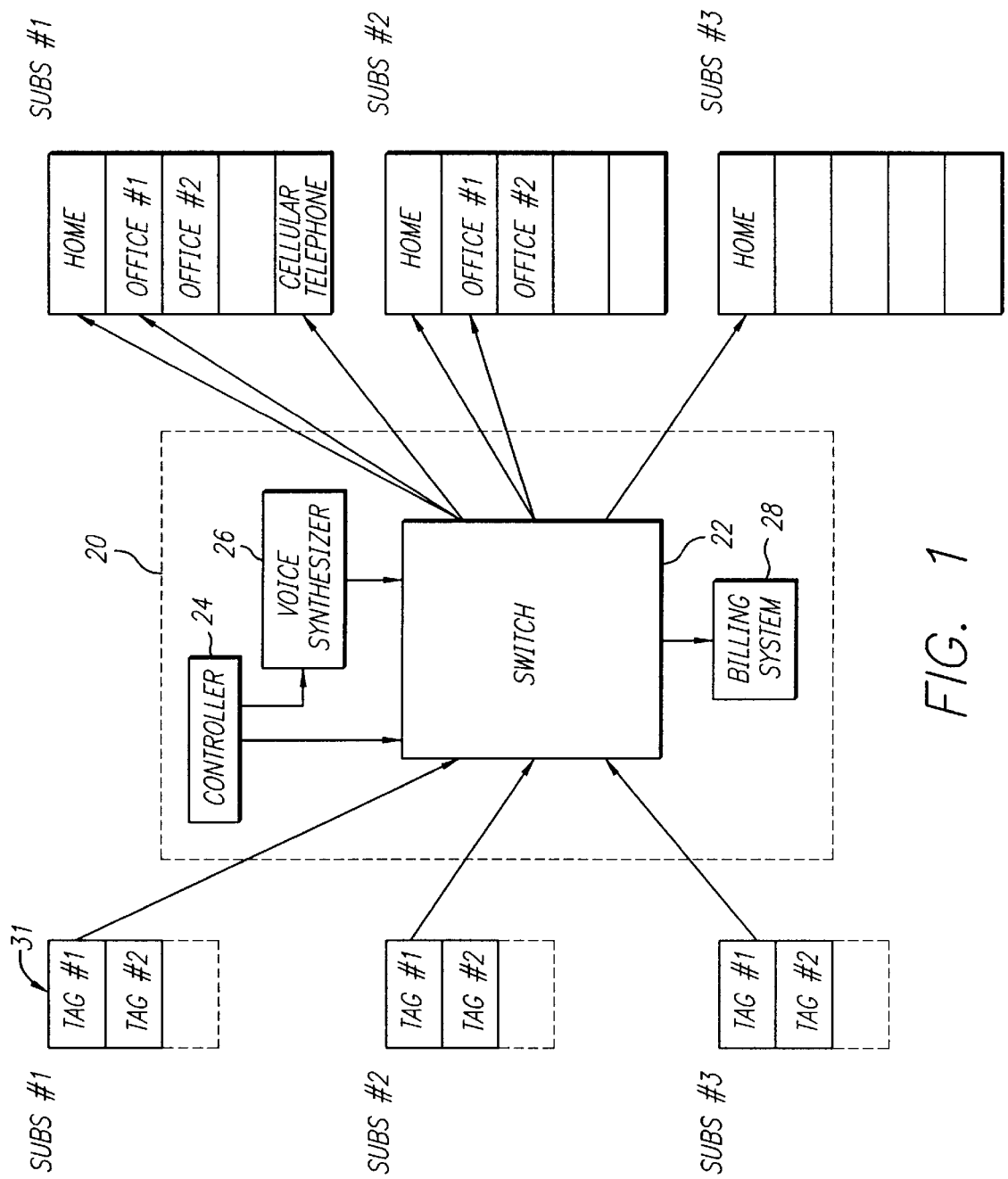
FIG. 1 is functional block diagram of an exemplary preferred embodiment of a system for anonymously establishing telephonic connections according to the present invention.
Figure 2:
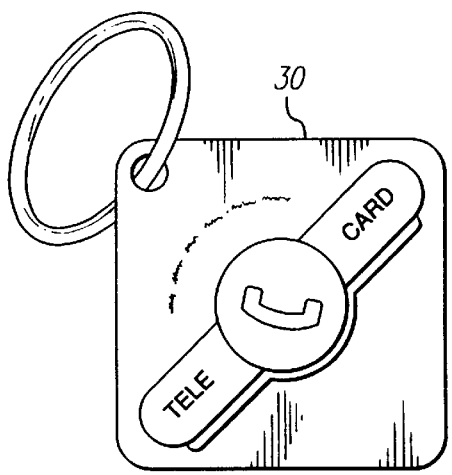
FIG. 2 is a front view of one of a plurality of unique identification tags of the system of FIG. 1.
Figure 3:
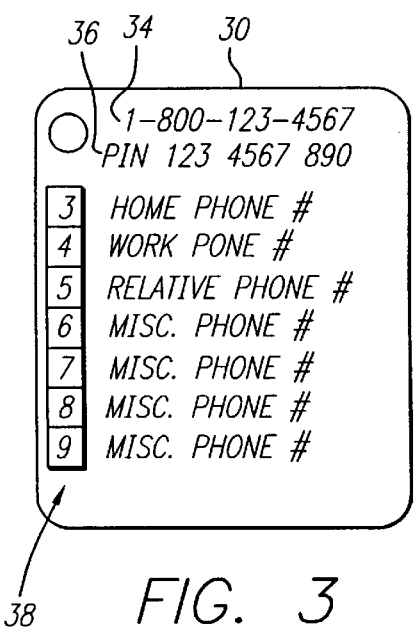
FIG. 3 is a rear view of the identification tag of FIG. 2.
Figure 4:
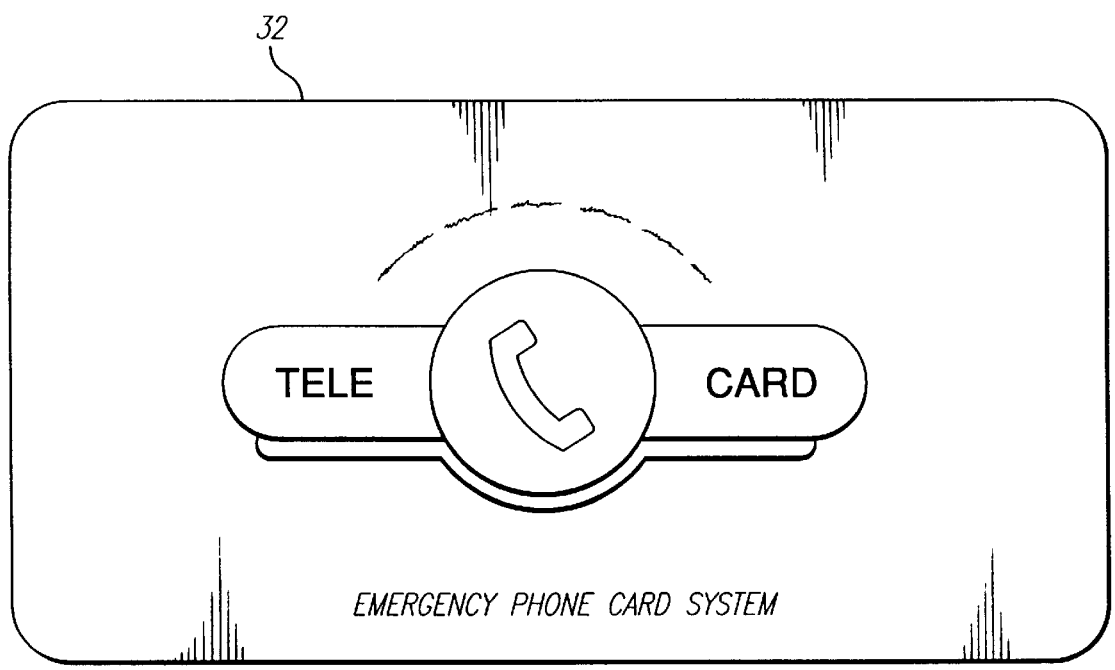
FIG. 4 is a front view of a master control card of the system of FIG. 1.

FIG. 1 shows a system 20 which comprises a telephone switch 22, a controller 24, a voice synthesizer 26 and billing system 28 functionally interconnected as shown. As shown in FIGS. 2 and 3, the system 20 also comprises a plurality of identification tags 30 which are worn, carried or otherwise secured to people, pets or inanimate objects. As shown in FIG. 4, the system further comprises at least one master control card 32.

A key feature of the present invention is that a plurality of subscribers (e.g., SUBS #1, SUBS #2, SUBS #3, as shown in FIG. 1) are able to utilize the same system 20. For example, a first subscriber SUBS #1 may employ two of the identification tags 30, one for a very young child and the other for a favorite pet. A second subscriber SUBS #2 may employ two of the identification tags 30, one for an elderly relative and the other for a teenage daughter. A third subscriber SUBS #3 may employ two of the identification tags 30, one for an expensive item of clothing and the other for a mentally challenged family member. Accordingly, the identification tags 30 are appropriately sized depending upon the nature of the clothing or apparel item, leash, object, etc. to which they are to be secured. For example, a preferred identification tag 30 for use with people is approximately 2"×2" in size. An identification tag 30 for pets is preferably smaller in size (e.g., approximately 1½"×1¼").

The identification tags 30 bear visible indicia providing information necessary for finders of the identification tags 30 to place toll-free telephone calls at a remote telephone 31 and to enter selected inputs from the visible indicia at the remote telephone 31. Generally, the processor 24 is adapted to receive the selected inputs and to control the telephone switch 22 to anonymously establish telephonic connections between finders of the identification tags 30 and the persons responsible for the people, pets or objects associated with the identification tags 30. In a preferred embodiment, the voice synthesizer 26 is adapted to receive voice synthesizer control inputs from the processor 24 and to generate vocal instructions to interactively prompt a finder of one of the identification tags 30 to enter the selected inputs at the remote telephone 31. As illustrated in FIG. 3, the visible indicia on the identification tags 30 preferably comprise: a central telephone number 34 associated with the switch 22; a personal identification number (PIN) 36 for each of the identification tags 30; and a series of speed dial prompts 38.

Each subscriber of the system 20 is given at least one of the master control cards 32. Although not shown in FIG. 4, each master control card 32 includes visible indicia on its rear side similar to that on the plurality of identification tags 30. The visible indicia on a preferred master control card 32 provide information needed for a subscriber (i.e., master controller) to provide programming inputs to the telephone switch 22. These visible indicia include the central telephone number 34 and a master control PIN. The master control card 32, by virtue of the master control PIN, provides a system subscriber with several capabilities. First, the subscriber is able to utilize the master control card 32 like any other calling card to dial any desired telephone number. Second, the subscriber is able to change stored data utilized by the processor 24 in establishing telephonic connections in response to the selected inputs provided by finders of the identification tags 30. Third, the subscriber is able to "recharge" stored talk time remaining values associated with each identification tag 30. Fourth, the subscriber is able to record a custom message for presentation to a caller via the voice synthesizer 26.

The controller or processor 24 includes a memory device which stores a computer-executable program adapted to receive and process the selected inputs as provided by the bearer or finders of the identification tags 30. The processor 24 processes the selected inputs to generate switching control inputs for the telephone switch 22. The computer-executable program is also adapted to receive and process the programming inputs provided by the subscribers and to change data stored in the memory device depending upon the programming inputs.

With regard to control of the voice synthesizer 26, the computer-executable program is adapted to receive and process the selected inputs and to generate voice synthesizer control inputs depending upon the selected inputs. Upon receipt of the programming inputs, e.g., after the master control PIN is received, the computer-executable program generates the voice synthesizer control inputs depending upon the programming inputs. The foregoing feature is significant because a common toll-free central telephone number 34 can therefore be used by both finders of the identification tags 30 and subscribers who hold the master control cards 32. Upon receipt of a master control PIN, a different portion of the computer-executable program is executed thereby providing different sets of synthesized vocal instructions to holders of the identification tags 30 and the master control cards 32, respectively.

Figure 5:
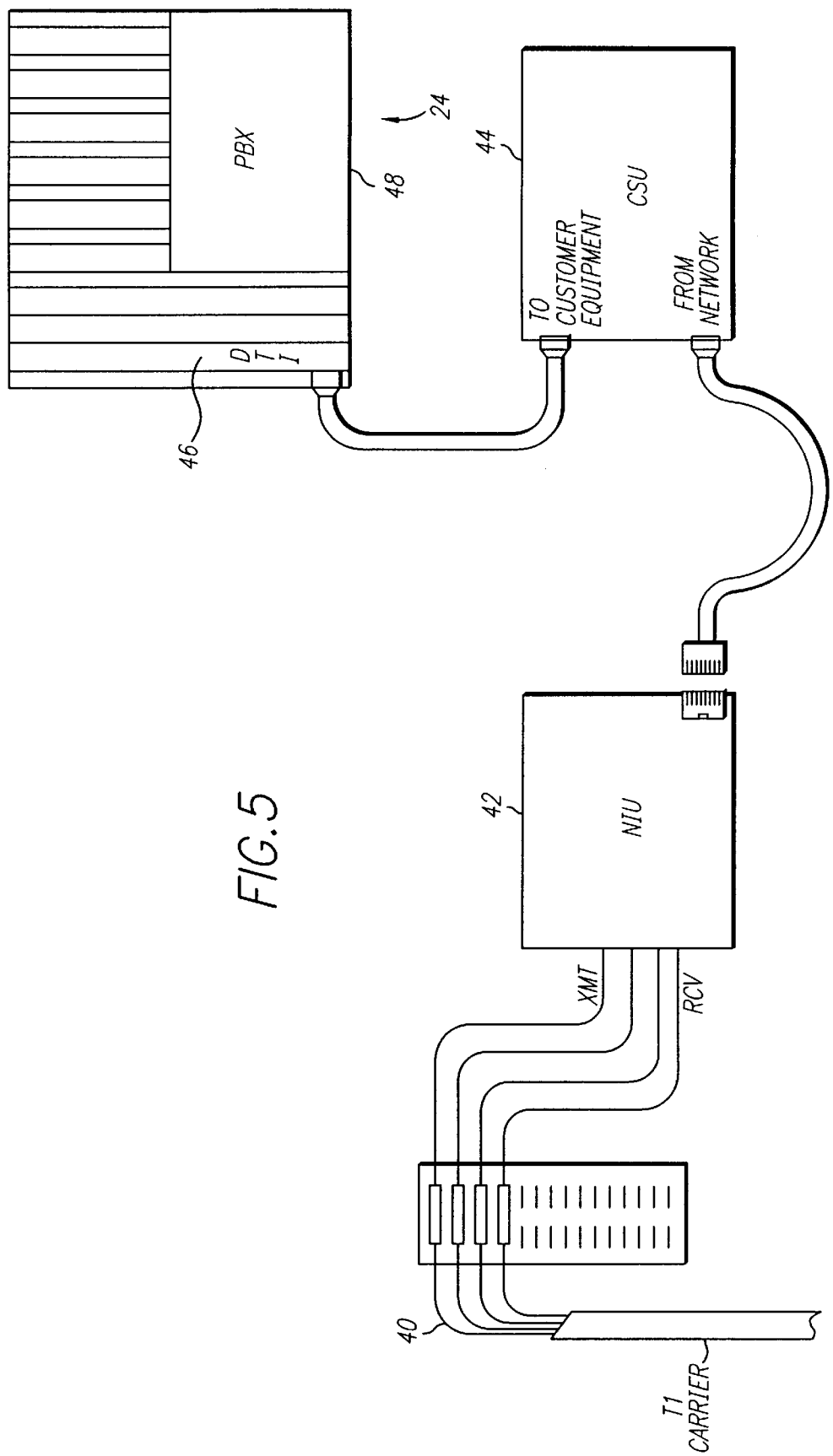
FIG. 5 illustrates a preferred configuration of electrical interface componentry between a T1 digital carrier line and the processor employed in the system of FIG. 1.
Figure 6:
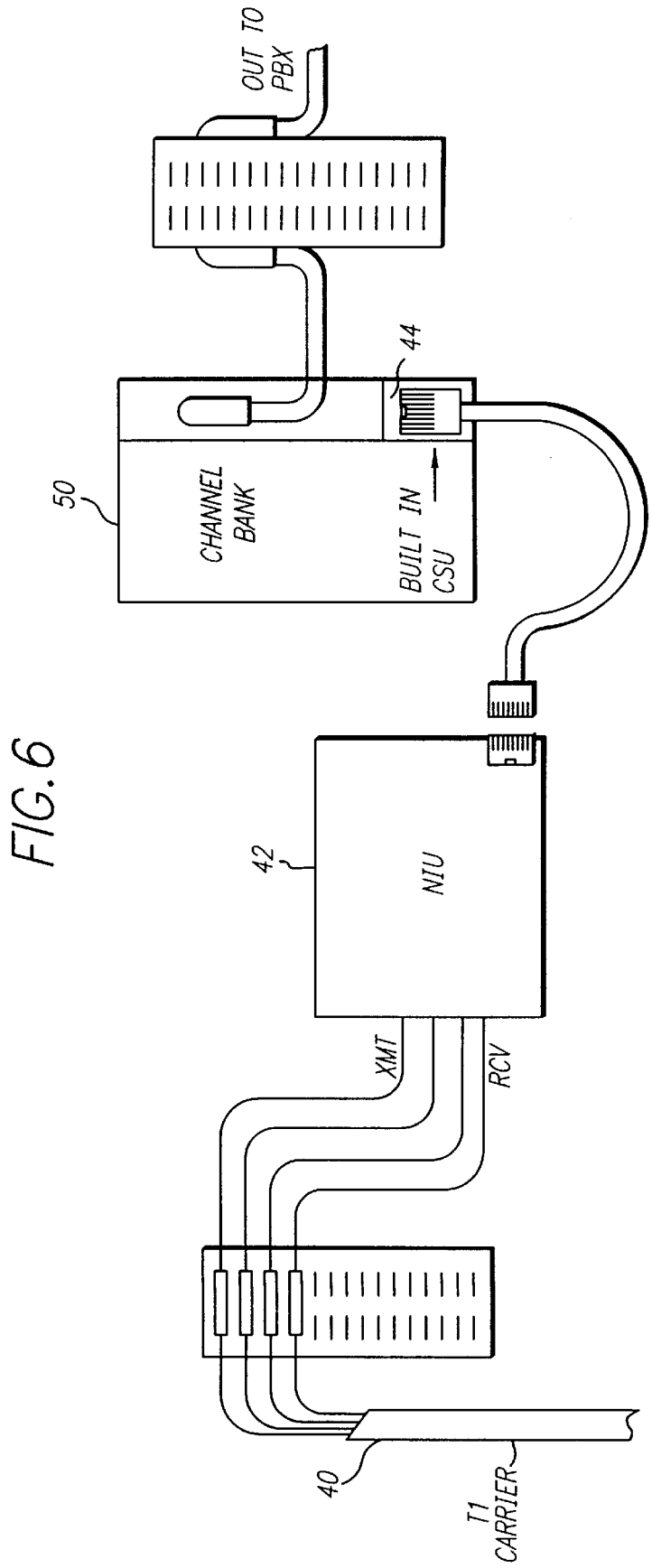
FIG. 6 illustrates an alternative preferred configuration of electrical interface componentry between a T1 digital carrier line and the processor in the system of FIG. 1.

FIG. 5 illustrates a preferred configuration of electrical interface componentry between a T1 digital carrier line 40 and the processor 24. The interface components are conventional and include a network interface unit (NIU) 42, channel service unit (CSU) 44, digital trunk interface (DTI) 46 and private branch exchange (PBX) 48 interconnected as shown. The NIU 42 provides a block or frame where the customer equipment interfaces to the circuit from the telephone company. The CSU 44 performs framing and formatting. The DTI 46 is a shelf in the system 20 which acts as a channel bank. The PBX 48 emulates the features and capabilities of the branch exchange office. As shown in FIG. 6, alternative electrical interface componentry may be employed. In FIG. 6 (PBX not shown), the interface components include a channel bank 50 with a built-in CSU 44. As may be readily appreciated, a variety of interfaces can be employed depending upon the complexity of the system, anticipated volume of system usage, geographic distances between central offices, etc.

Figure 7:
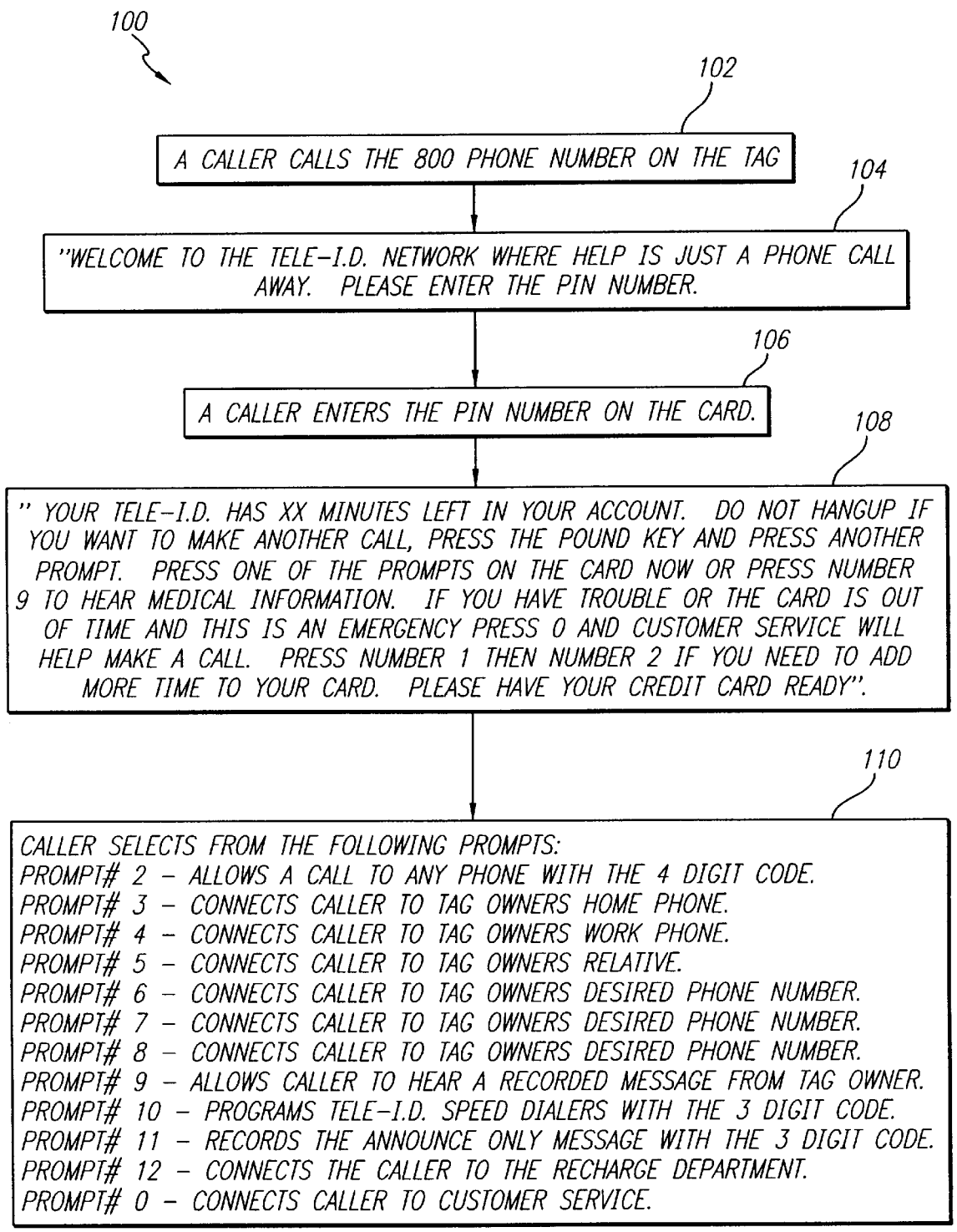
FIG. 7 is a flow chart illustrating an exemplary opening message sequence presented to a caller of the system of FIG. 1.

FIG. 7 is a flow chart illustrating an exemplary opening message sequence 100 presented to a caller holding one of the 5 identification tags 30. At block 102, the central telephone number 34 on the identification tag 30 is dialed by the caller. At block 104, a telephonic connection between the remote telephone and the system 20 is established and the voice synthesizer 26 is directed by the processor 24 to articulate a vocal greeting and instruction such as shown. At block 106, the caller enters the PIN 36 shown on the identification tag 30. Thereafter, the instruction block 108 is executed, explaining the various options available to the caller while making reference to the visible indicia on the identification tag 30. In response, the caller selects one of the prompts as shown in block 110. It should be appreciated that not all of the illustrated prompts need be available to holders of the identification tags 30. For example, a preferred identification tag 30 for use with people only includes indicia of prompts #3–#9. An identification tag 30 for pets preferably only shows prompts #3, #4, #6 and #9. Furthermore, the processor 24 is preferably programmed such that certain prompts (e.g., prompt #2) cannot be entered by individuals who have not first entered a valid master control PIN. Although, the master control PIN is indicated in block 110 as comprising a 4 digit code, it should be appreciated that codes varying in their number of digits can also be employed.

Stored data in the memory device of the processor 24 includes stored telephone numbers, associations between the speed dial prompt numbers and the stored telephone numbers, time remaining values, associations between the identification tags 30 and the time remaining values, stored time expended values, and associations between the identification tags 30 and the store time expended values. When a subscriber who has entered a master control PIN selects prompt #12, the voice synthesizer prompts the subscriber to change the stored data to modify the stored time remaining values. Advantageously, this allows a subscriber to provide a child, teenager or even a college student with a calling card while simultaneously limiting usage of that calling card. More specifically, this calling card only has an amount of talk time determined by the subscriber. Furthermore, the holder of the identification card 30 is strictly limited to a small group of approved telephone numbers (e.g., parents, library). Accordingly, the abuses which normally accompany provision of an unlimited calling card to a teenager are inherently prohibited by the identification tag 30 of the present invention.

Further with regard to block 108 of FIG. 7, it is contemplated that the computer-executable program can be alternatively programmed to disregard or not even monitor stored time remaining values. Such a system is preferable to the extent that authorized telephonic connections will always be established by the system 20 without the need for operator assistance when there is no time remaining on a particular identification tag 30.

When a subscriber who has entered a master control PIN selects prompt #10, the voice synthesizer interactively prompts the subscriber to change the stored data to modify the stored telephone numbers and the associations between the speed dial prompt numbers and the stored telephone numbers. FIG. 8 is a flow chart illustrating an exemplary message sequence 200 for this auto dialer setup feature.

FIG. 9 is a flow chart illustrating an exemplary message sequence 300 for a record announce only message feature which a subscriber initiates by selecting prompt #11. This feature is particularly useful to quickly enable someone who finds a disabled holder of an identification tag 30 who, for example, is experiencing a diabetic coma, to take the proper resuscitating actions and/or call for the proper specialized medical assistance.

With regard to the billing system 28, the computer-executable program is programmed to monitor and store a total time expended value from the stored time expended values. Accordingly, a subscriber can be billed on a periodic basis for all telephone calls made by holders of the identification tags 30 associated with that subscriber. The talk time of calls made by a subscriber with the master control card 32 can also be added to the total time expended value if desired.

In conclusion, it is to be understood that the foregoing detailed description and the accompanying drawings illustrate the principles of the invention. However, various changes and modifications may be employed without departing from the spirit and scope of the invention. Thus, by way of example and not of limitation, the identification tags 30 can be modified to additionally include digitized information, e.g., a medical history, of the holder on a magnetic strip. Accordingly, the present invention is not limited to the specific form shown in the drawings and described in detail hereinabove.

What is claimed is:

1. A system for anonymously establishing telephonic connections comprising:
   a plurality of identification tags including visible indicia providing information needed for finders of said identification tags to place toll-free telephone calls to a computer-controlled telephone switching system and to provide selected inputs from the visible indicia to the computer controlled telephone switching system; and
   a processor adapted to receive the selected inputs and to control the computer-controlled telephone switching system to anonymously establish telephonic connections between finders of said identification tags and persons responsible for people, pets or objects associated with said identification tags.

2. The system for anonymously establishing telephonic connections of claim 1 wherein the visible indicia include:
   central telephone number associated with a central telephone switch;
   a personal identification number (PIN) for each of said identification tags; and
   a series of speed dial prompt numbers.

3. The system for anonymously establishing telephonic connections of claim 2 wherein the computer-controlled telephone switching system employs the PINs and a selected one of the series of speed dial prompt numbers to establish the telephonic connections.

4. The system for anonymously establishing telephonic connections of claim 1 further comprising:
a voice synthesizer electrically connected to said computer-controlled telephone switching system, said voice synthesizer being adapted to interactively prompt the callers to select the selected inputs.

5. The system for anonymously establishing telephonic connections of claim 4 wherein:
said processor is adapted to receive the selected inputs and to generate switching control inputs and voice synthesizer control inputs depending upon the selected inputs;
said computer-controlled telephone switching system being adapted to receive the switching control inputs and to establish the telephonic connections depending upon the switching control inputs; and
said voice synthesizer being adapted to receive the voice synthesizer control inputs and to interactively prompt the callers to select the selected inputs depending upon the voice synthesizer control inputs.

6. A system for establishing telephonic connections comprising:
a plurality of identification tags including visible indicia providing information needed for finders of said identification tags to place toll-free telephone calls at a remote telephone and to enter selected inputs from the visible indicia at the remote telephone;
a master control telephone calling card including visible indicia providing information needed for a master controller to provide programming inputs to a telephone switching system;
a computer-executable program for execution on a processor adapted to receive the selected inputs and to generate switching control inputs and voice synthesizer control inputs depending upon the selected inputs, the processor being adapted to receive the programming inputs and to change stored data provided to said computer-executable program depending upon the programming inputs;
a voice synthesizer adapted to receive the voice synthesizer control inputs and to generate vocal instructions to interactively prompt a finder of one of said identification tags to enter the selected inputs at the remote telephone; and a telephone switching system electrically connected to said voice synthesizer and adapted to receive the switching control inputs, said telephone switching system establishing telephonic connections between the finders of said identification tags and persons responsible for people, pets or objects associated with said identification tags.

7. The system for establishing telephonic connections of claim 6 wherein the visible indicia on said plurality of identification tags include:
a central telephone number associated with a central telephone switch;
a personal identification number (PIN) for each of said identification tags; and
a series of speed dial prompt numbers.

8. The system for establishing telephonic connections of claim 6 wherein:

the visible indicia on said master control telephone calling card includes:
said central telephone number; and
a master control PIN.

9. The system for establishing telephonic connections of claim 8 wherein:
said computer-executable program is programmed to determine, upon receipt of the master PIN, the voice synthesizer control inputs depending upon the programming inputs.

10. The system for establishing telephonic connections of claim 9 wherein:
the visible indicia on said plurality of identification tags include a series of speed dial prompt numbers;
the stored data include stored telephone numbers and associations between the speed dial prompt numbers and the stored telephone numbers; and
said voice synthesizer interactively prompts the master controller to change the stored data to modify the stored telephone numbers and the associations between the speed dial prompt numbers and the stored telephone numbers.

11. The system for establishing telephonic connections of claim 9 wherein:
the stored data include stored time remaining values and associations between said identification tags and the stored time remaining values; and
said voice synthesizer interactively prompts the master controller to change the stored data to modify the stored time remaining values.

12. The system for establishing telephonic connections of claim 9 wherein:
the stored data include stored time expended values and associations between said identification tags and the stored time expended values; and
said computer-executable program is programmed to monitor and store a total time expended value from the stored time expended values.

13. A method for anonymously establishing telephonic connections, comprising the steps of:
(a) providing a plurality of identification tags including visible indicia providing information needed for finders of said identification tags to place toll-free telephone calls to a computer-controlled telephone switching system and to provide selected inputs from the visible indicia to the computer controlled telephone switching system; and
(b) providing a processor adapted to receive the selected inputs and to control the computer-controlled telephone switching system to anonymously establish telephonic connections between finders of said identification tags and persons responsible for people, pets or objects associated with said identification tags.

14. A method for anonymously establishing telephonic connections, comprising the steps of:
(a) providing a plurality of identification tags including visible indicia providing information needed for finders of said identification tags to place toll-free telephone calls at a remote telephone and to enter selected inputs from the visible indicia at the remote telephone;
(b) providing a master control telephone calling card including visible indicia providing information needed for a master controller to provide programming inputs to a telephone switching system;
(c) providing a computer-executable program for execution on a processor adapted to receive the selected inputs and to generate switching control inputs and voice synthesizer control inputs depending upon the selected inputs, the processor being adapted to receive the programming inputs and to change stored data provided to said computer-executable program depending upon the programming inputs;

(d) providing a voice synthesizer adapted to receive the voice synthesizer control inputs and to generate vocal instructions to interactively prompt a finder of one of said identification tags to enter the selected inputs at the remote telephone; and (e) providing a telephone switching system electrically connected to said voice synthesizer and adapted to receive the switching control inputs, said telephone switching system anonymously establishing telephonic connections between the finders of said identification tags and persons responsible for people, pets or objects associated with said identification tags.

15. A method for anonymously establishing telephonic connections, comprising the steps of:

(a) providing a plurality of identification tags including visible indicia of:
(1) a central telephone number associated with a central telephone switch;
(2) a unique personal identification number (PIN) for each of said identification tags; and
(3) a series of speed dial prompt numbers;

(b) telephoning said central telephone number on a located identification tag of said identification tags from a remote telephone to establish a telephonic connection between said central telephone switch and said remote telephone;

(c) from said central telephone switch, providing a vocal instruction delivered at said remote telephone to enter said PIN number on said located identification tag;

(d) from said remote telephone, entering said PIN number on said located identification tag;

(e) from said central telephone switch, providing a vocal instruction delivered at said remote telephone to enter a selected speed dial prompt number from said series of speed dial prompt numbers;

(f) from said remote telephone, entering said selected speed dial prompt number;

(g) via said central telephone switch, employing said PIN on said located identification tag and said selected speed dial prompt number to establish a telephonic connection between a telephone of a person responsible for an object associated with said located identification tag and said remote telephone; and (h) repeating steps (a)–(g) for different identification tags bearing different PIN numbers.

16. The method for anonymously establishing telephonic connections of claim 15, further comprising the steps of:

(i) providing a master control telephone calling card including visible indicia of:
(1) said central telephone number; and
(2) a master control PIN; and (j) employing said master control PIN to remotely program an executable program which controls operation of said central telephone switch.

17. The method for anonymously establishing telephonic connections of claim 16, further comprising the steps of:

(k) associating said master control telephone calling card with one or more of said identification tags; and (l) charging all telephone calls originating from said one or more of said identification tags associated with said master control telephone calling card to a single payment account.

18. A system for anonymously establishing telephonic connections comprising:

a plurality of identification tags including visible indicia providing information needed for finders of said identification tags to place toll-free telephone calls to a computer-controlled telephone switching system and to provide selected inputs from the visible indicia to the computer controlled telephone switching system; and a processor adapted to receive the selected inputs and to control the computer-controlled telephone switching system to anonymously establish telephonic connections between finders of said identification tags and persons responsible for people, pets or objects associated with said identification tags without human intervention.

19. The system for anonymously establishing telephonic connections of claim 1, wherein said processor is capable of establishing a telephone connection between a holder of said identification tag and another person in response to second selected inputs.

20. The system for establishing telephonic connections of claim 6, wherein said processor is capable of establishing a telephone connection between a holder of said identification tag and another person in response to second selected inputs.

21. The method for anonymously establishing telephonic connections of claim 13, wherein said processor is capable of establishing a telephone connection between a holder of said identification tag and another person in response to second selected inputs.

22. The method for anonymously establishing telephonic connections of claim 14, wherein said processor is capable of establishing a telephone connection between a holder of said identification tag and another person in response to second selected inputs.

* * * * *